(12) United States Patent
Guterman et al.

(10) Patent No.: US 7,349,941 B2
(45) Date of Patent: Mar. 25, 2008

(54) DATA TRANSFER OVER A NETWORK COMMUNICATION SYSTEM

(75) Inventors: Jose Guterman, Calgary (CA); Theo J. Smit, Calgary (CA)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/014,008

(22) Filed: Dec. 10, 2001

(65) Prior Publication Data

US 2003/0110207 A1    Jun. 12, 2003

(51) Int. Cl.
*G06F 15/16*    (2006.01)
*G06F 7/00*    (2006.01)

(52) U.S. Cl. ......................................... 709/202; 707/10

(58) Field of Classification Search ................ 709/201, 709/202, 200, 203, 217, 219; 358/1.15; 707/10; 370/546; 701/24, 200
See application file for complete search history.

(56) References Cited

U.S. PATENT DOCUMENTS

| | | | | |
|---|---|---|---|---|
| 5,727,159 | A * | 3/1998 | Kikinis ........................ 709/246 |
| 6,002,852 | A * | 12/1999 | Birdwell et al. ............ 709/203 |
| 6,134,566 | A * | 10/2000 | Berman et al. ............. 715/526 |
| 6,230,048 | B1 * | 5/2001 | Selvester et al. ........... 600/523 |
| 6,267,733 | B1 * | 7/2001 | Peterson et al. ............ 600/587 |
| 6,529,757 | B1 * | 3/2003 | Patel et al. ................. 600/407 |
| 6,633,314 | B1 * | 10/2003 | Tuli ............................ 715/744 |
| 6,788,980 | B1 * | 9/2004 | Johnson ......................... 700/1 |
| 6,842,777 | B1 * | 1/2005 | Tuli ............................ 709/217 |
| 6,920,488 | B1 * | 7/2005 | Le Pennec et al. ......... 709/219 |
| 7,047,201 | B2 * | 5/2006 | Chang ........................ 704/503 |
| 2001/0039497 | A1 * | 11/2001 | Hubbard ....................... 705/1 |
| 2001/0047359 | A1 * | 11/2001 | Videcrantz et al. ......... 707/101 |
| 2002/0011937 | A1 * | 1/2002 | Tanenhaus et al. .... 340/870.05 |
| 2002/0013832 | A1 * | 1/2002 | Hubbard ..................... 709/220 |
| 2002/0018451 | A1 * | 2/2002 | Sharony ..................... 370/329 |
| 2002/0029384 | A1 * | 3/2002 | Griggs ......................... 725/46 |
| 2002/0085497 | A1 * | 7/2002 | Phillips et al. ............ 370/235.1 |
| 2002/0086706 | A1 * | 7/2002 | Chen et al. ................. 455/560 |
| 2002/0092012 | A1 * | 7/2002 | Shah .......................... 717/170 |
| 2002/0123330 | A1 * | 9/2002 | Yen ............................ 455/414 |
| 2002/0165721 | A1 * | 11/2002 | Chang ........................ 704/503 |
| 2002/0177453 | A1 * | 11/2002 | Chen et al. ................. 455/466 |
| 2003/0054810 | A1 * | 3/2003 | Chen et al. ................. 455/422 |
| 2004/0083273 | A1 * | 4/2004 | Madison et al. ............ 709/217 |
| 2004/0184463 | A1 * | 9/2004 | Dauchy et al. ......... 370/395.21 |
| 2004/0193499 | A1 * | 9/2004 | Ortiz et al. ................... 705/17 |
| 2005/0034057 | A1 * | 2/2005 | Hull et al. ................ 715/500.1 |
| 2005/0060237 | A1 * | 3/2005 | Barsness et al. ............. 705/26 |
| 2005/0240672 | A1 * | 10/2005 | Chen et al. ................. 709/229 |
| 2007/0016695 | A1 * | 1/2007 | Rabbers et al. ............. 709/248 |

\* cited by examiner

*Primary Examiner*—David Wiley
*Assistant Examiner*—J Bret Dennison
(74) *Attorney, Agent, or Firm*—Fish & Richardson P.C.

(57) ABSTRACT

A method of transferring data includes receiving unprocessed data and processing the data into processed data. On the basis of a predetermined criteria, unprocessed data or processed data is transmitted. By choosing to transmit unprocessed data or processed data to a receiving site, which maybe processed at the receiving site, faster transmission times can be achieved.

28 Claims, 3 Drawing Sheets

DATA TRANSFER OVER A NETWORK COMMUNICATION SYSTEM

BACKGROUND

This invention relates to transferring data over a network communication system.

Computers typically require access to databases for information. Accessing a database can result in large amounts of data being transferred to the computer. The computer will often include an application program, for example, a web browser to process the transferred data by sorting and filtering the data into a more manageable and useful data subset. The data subset can then be displayed on the computer for presentation.

Computers can exchange or share information over communication networks. The networks can be in the form of "hard" connections (e.g., wires or cable) or wireless (e.g., radio frequency). Wireless networks provide flexibility to the users and reduces costs associated with installation of cable or wire. However, such advantages and costs may be offset by other considerations. For example, wireless data transfer is typically slower than cable and can require expensive transmission and reception equipment. Data bandwidth is a parameter used to characterize transfers on a communication link. For example, data bandwidth can be defined as the size of the data to be transferred in units of bits or as the transmission rate of the data transferred in units of bits per second. By quantifying and optimizing the data bandwidth for the communication link being used, cost effective communications is achievable.

DESCRIPTION

As will be described in greater detail below, a system and method for transferring data includes transmitting, on the basis of a predetermined criteria, data either unprocessed or processed. The data, depending on whether unprocessed or processed when received, may require further processing.

Figure 1:
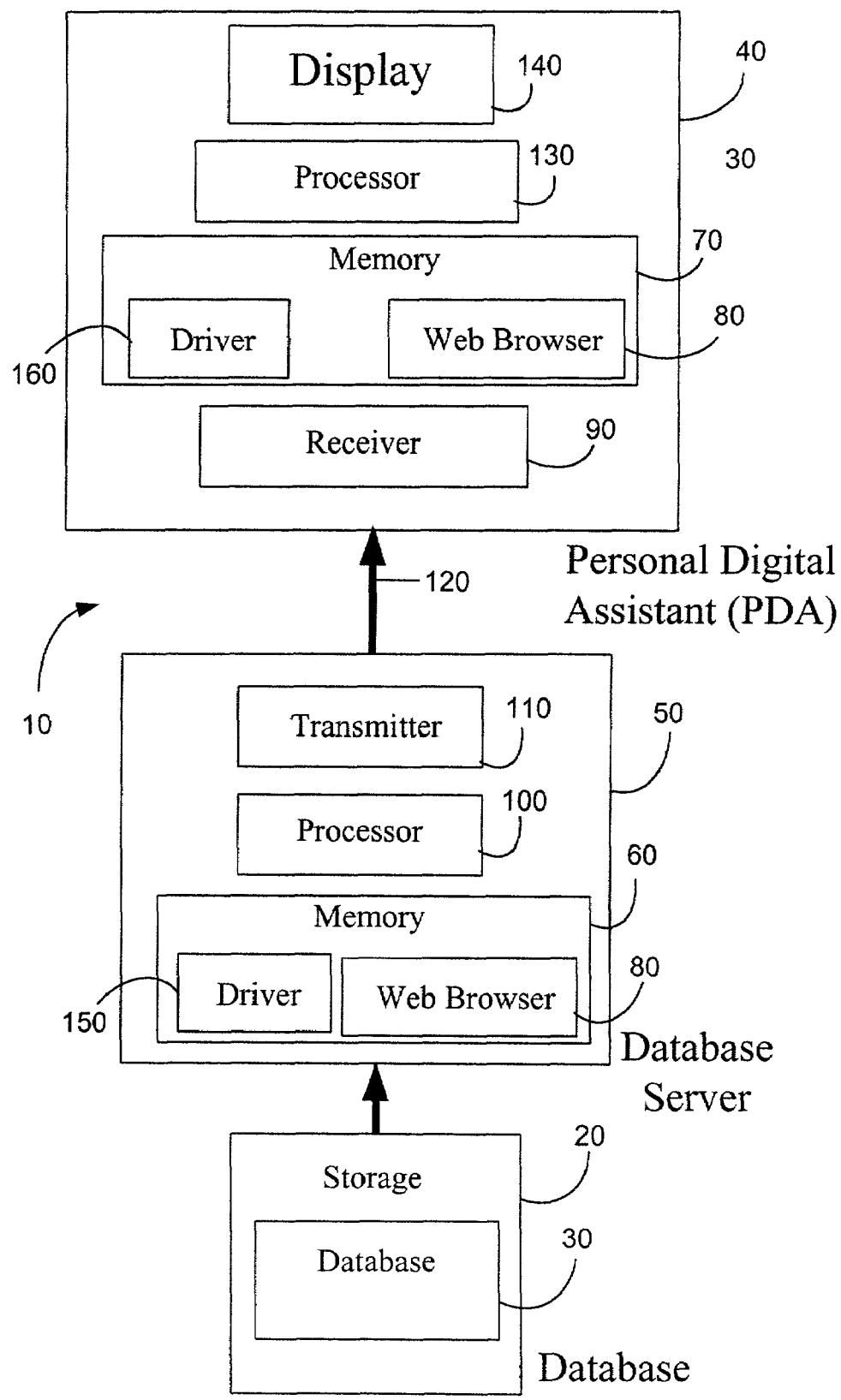
FIG. 1 is a data transfer system.

Referring to FIG. 1, a data transfer system 10 includes a database server 50 for controlling the transfer of information, residing in a database 30 and stored in a storage 20, to a handheld PDA 40. As will be described in greater detail below, database server 50 processes information and then determines whether to transmit the processed information or to transmit the unprocessed information to the PDA 40.

Database server 50 includes a processor 100 which, among other tasks, executes instructions from a web browser 80 to locate and display web pages. In this example, web browser 80 is capable of displaying graphics as well as text and can process multimedia data (e.g., audio and video). Processor 100 executes a series of instructions, received from a web browser 80 located in memory 60, to process the data received. The processor 100 also executes instructions, received from the a driver 150 located in memory 60, to determine whether unprocessed or processed data may be better suited for transmission to the hand-held PDA 40 using transmitter 110. PDA 40 includes a receiver 90 that receives the data transmitted from database server 50 via a wireless link 120. PDA 40 also includes memory 70 that stores the received data, a driver 160, and the same or similar web browser 80 stored at the database server 50, as well as a processor 130 for receiving a series of data processing instructions from the driver 160 for determining if the received data was processed before transmission. If so, the processor transfers the data to the memory 70 of the PDA 40. If, on the other hand, the data is determined to be unprocessed, the processor 130 will process the data with instructions from the web browser 80. The processed data is then transferred to the memory 70 of the PDA 40. Once stored in the memory 70 of the PDA 40, processor 130 transfers the processed data to a display 140, included in the PDA 40, for presentation to a user. By determining which of the processed or unprocessed data from the database 30 should be transferred to the PDA 40, faster data transfer and reduced transmission cost can be achieved.

Figure 2:
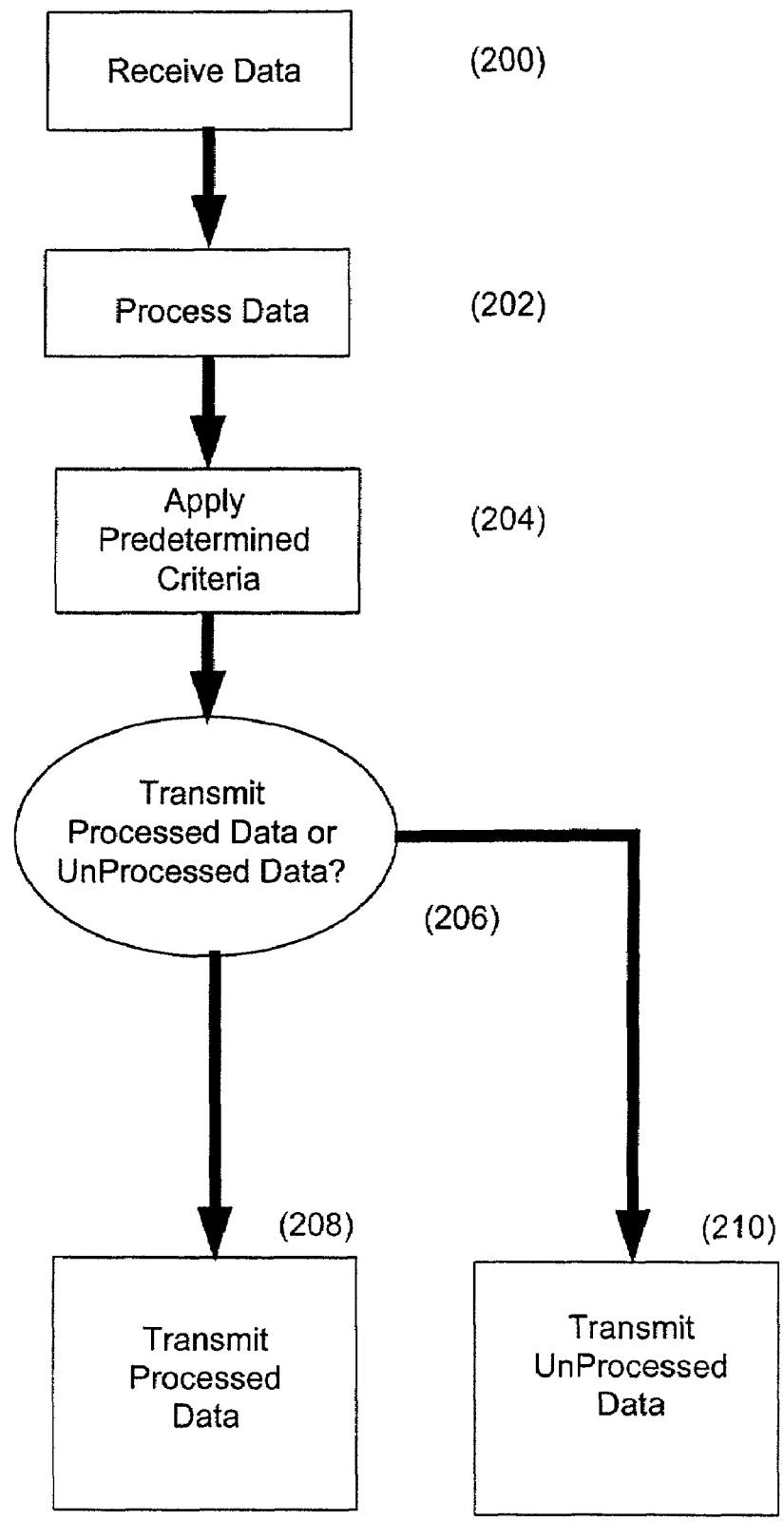
FIG. 2 is a flow diagram of a database server operation.

With reference to FIG. 2, the series of operations performed by the database server 50 are shown. In general, the database server 50 receives data (200) and processes the data (202). The database server 50 then applies a predetermined criteria (204) and on the basis of the criteria determines whether to transmit processed or unprocessed data (206). Once determined, the database 50 server then transmits the processed data (208) or the unprocessed data (210).

Figure 3:
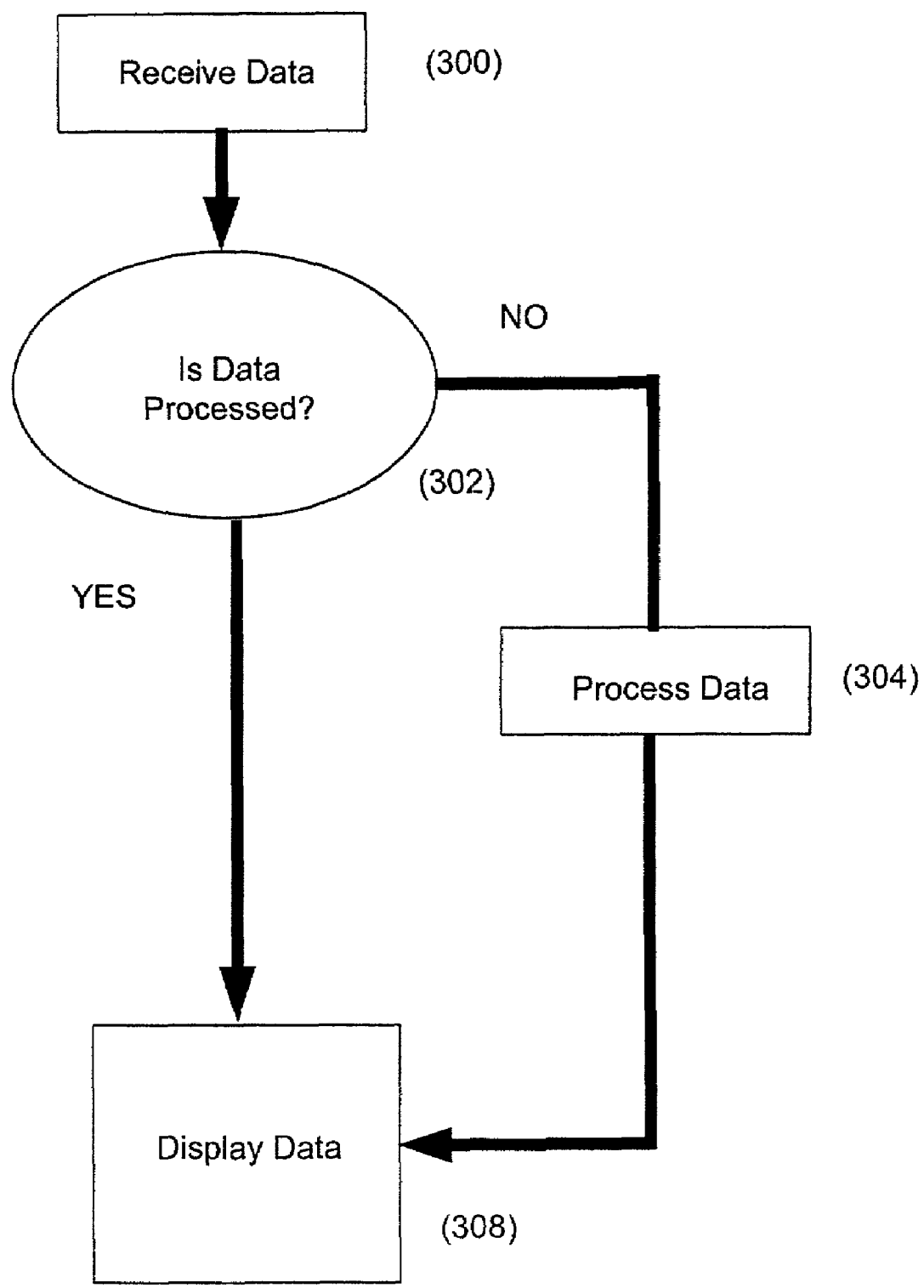
FIG. 3 is a flow diagram of a hand-held PDA operation.

Referring to FIG. 3, the series of operations performed by the hand-held PDA 40 are shown. In particular, PDA 40 receives data (300) and determines if the received data was processed before transmission (302). If processed, the data is immediately displayed (308). On the other hand, if the received data was not processed, the data is then processed (304) by the PDA 40 before being displayed (308).

The web browser 80 discussed above is one example of an application program that can be stored in the memory 60 of the database server 50 and the memory 70 of the PDA 40. In another example, the application program can be a geographical display program stored in the memory 60 of the database server 50 and the memory 70 of the PDA 40. The geographical display program allows a user of the PDA 40 to request geographical data of a road in a particular city from the database 30. The geographical data of the city can be retrieved from the database 30 and processed by the geographical display program that is stored in the memory 60 of the database server 50. The geographical display program filters the geographical data so that only the particular road of interest is provided. The database server 50 can use the driver 150 to determine whether to transfer the processed road data or the unprocessed city data. The processed or unprocessed data would then be transferred, and received by the receiver 90 in the hand-held PDA 40. The processor 130 of the hand-held PDA 40 would determine, by executing instructions from driver 160, whether the data was processed road data or unprocessed city data. If data is processed road data, the processor 130 would transfer the road data to the display 140 for presentation to the user. If the data is unprocessed city data, the processor 130 would process the city data, using instructions from the geographical display program, to the reduced road data. The road data would then be transferred to the display 140 of the hand-held PDA 40 for use by the user.

Storing web browser 80, in the memory 60 of database server 50, can be accomplished by various methods. In one approach, the web browser 80 is stored in a dedicated portion of memory 60 of the database server 50, as is common practice, and is easily available to the database server 50. Alternatively, the web browser 80 can be stored in the memory 60 of the database server 50 with access limited to particular subscribers. In still another approach, the web browser 80 can be loaded into the memory 60 of the database server 50, for example by the user of the PDA 40.

Driver 150, located in the memory 60 of the database server 50, can be included within the web browser 80 or any application program stored in the memory 60 of the database server 50. Similarly, the driver 160, located in the memory 70 of the hand-held PDA 40, can be included in the web browser 80 or any other application program stores in the memory 70 of the hand-held PDA 40.

In the example discussed above in conjunction with FIG. 1, a hand-held PDA was used to receive data from the database 30 and display the data to a user. However other hand-held units, including lab-top computers, cell phones, MP3 players, or other similar devices can receive data from the data server 50, process the data with a web browser 80, and transfer the data to a display.

It is generally preferable to reduce the cost of transmission. Along with monetary cost, transmission cost can also be measured by the amount of resource usage or similar measure. Thus, to lower transmission cost, various criteria can be used to determine whether to transmit processed or unprocessed data from the database server 50. For example, the criteria can be based on the least expensive cost of transmission. In another example, as described above, processor 100 determines which of the processed or unprocessed data has the least number of bits. The database server 50 then transmits the data of smaller size, which is generally less expensive. The criteria can also be based on the transmission speed. Generally, a faster transmission speed provides a smaller transmission period and a lower transmission cost. In many cases, the cost of processing information is less expensive than transmitting the information, regardless of whether the data is processed or unprocessed. Thus, in most cases processing to reduce transmission time is generally worthwhile. The processing time itself can also be the criteria. For example, if the processing time exceeds a predetermined processing time, it would be preferable to transmit the unprocessed data despite the larger transmission cost. Thus, there may be implementations in which it may be preferable to transmit data with a larger cost. Also, the criteria can be based on a combination of the criteria listed above.

The web browser 80, or any other application program stored in the memory 60 of the database server 50 and the memory 70 of the hand-held PDA 40, can be an applet. An applet is an application that has limited features, requires limited memory resources, and is usually portable between operating systems. Also, the web browser 80 that is stored in the hand-held PDA 40 can be executed only when processing at the hand-held PDA 40 is required.

The database server 50 can be located remotely from the database 30 and can access numerous databases 30 in various locations. Similarly, the application program (e.g., web browser 80) can be stored at a site remote from the memory 60 of the database server 50. Thereby, the processing can be done at another entity. For example, the web browser 80 can be stored in a device, that is connected to the database server 50 through a network connection, and has the wireless link 120 with the hand-held PDA 40.

Processor 100 of the database server 50 and processor 130 of the hand-held PDA 40 can be a microprocessor, microcontroller or other computing device. The wireless link 120 is only one example of a communication link. Other examples include cables or other network connections. In another example, the wireless link 120 can be in the form of an electromagnetic or infrared communication link. As described above, the display 140 provides a user interface between the hand-held PDA 40 and a user. An audio speaker, keyboard, or network connection are other examples of user interfaces that can be implemented with the hand-held PDA 40.

A number of examples of the invention have been described. Nevertheless, it will be understood that various modifications may be made without departing from the spirit and scope of the invention. Accordingly, other examples are within the scope of the following claims.

What is claimed is:

1. A system comprising:
    a memory for storing a web browser program including a series of instructions for processing unprocessed data into processed data;
    a processor configured to execute the series of instructions included in the web browser program for processing the unprocessed data into the processed data, and said processor also operating to select, on the basis of a predetermined criteria set forth within the series of instruction, one of the unprocessed data or the processed data that corresponds to the unprocessed data and represents the same underlying information and to determine an amount of time to process the unprocessed data into processed data;
    a transmitter for sending one of the unprocessed data and the processed data as selected by said processor to a handheld device and for determining an amount of time it will take to transmit the processed data as compared with a second amount of time it will take to transmit the unprocessed data; and
    wherein said predetermined criteria used for determining whether to transmit the unprocessed data or the processed data is based on the total amount of time necessary for both said transmit and said processing.

2. The system of claim 1 wherein the predetermined criteria is based on the size of the unprocessed data relative to the size of the processed data.

3. The system of claim 1 wherein the predetermined criteria is based on the transmission speed.

4. The system of claim 1 wherein the predetermined criteria is based on the processing time of the unprocessed data.

5. The system of claim 1 wherein the predetermined criteria is the cost of transmission.

6. The system of claim 5 wherein the cost of transmission is resource usage.

7. The system of claim 1 wherein the web browser program is an applet.

8. The system of claim 1 wherein the web browser program and transmitter are in different locations.

9. The system of claim 1 wherein the web browser program is loaded into the memory from a different location.

10. The system of claim 1 further comprising:
    the hand-held comprising; a receiver for receiving a transmitted data from the transmitter, the transmitted data is one of the unprocessed data and the processed data;
    a memory for storing the transmitted data, the memory storing an application program including a series of instructions for processing the transmitted unprocessed data into the processed data, and
    a processor configured to execute the series of instructions for processing the transmitted unprocessed data into the processed data, transferring the processed data to a user interface.

11. The system of claim 10 wherein the web browser program stored in the memory is the same web browser program stored in the memory of the hand-held unit.

12. A computer-implemented method of transferring data comprising:
receiving unprocessed data;
processing the unprocessed data into processed data using a web browser program;
transmitting, on the basis of a predetermined criteria that is defined by said web browser program, one of the unprocessed data and the processed data that corresponds to the unprocessed data and represents the same underlying information and
determining an amount of time it will take to transmit the processed data as compared with a second amount of time it will take to transmit the unprocessed data, determining an amount of time to process the unprocessed data into processed data, and wherein said predetermined criteria used for determining whether to transmit the unprocessed data or the processed data makes the decision based on the total amount of time necessary for both said transmit and said processing.

13. The computer-implemented method of claim 12 further comprising:
determining whether to transmit the unprocessed data or the processed data on the basis of the size of the unprocessed data relative to the size of the processed data.

14. The computer-implemented method of claim 12 further comprising:
determining whether to transmit the unprocessed data or the processed data on the basis of the transmission speed.

15. The computer-implemented The method of claim 12 further comprising:
determining whether to transmit the unprocessed data or the processed data on the basis of the processing time of the unprocessed data.

16. The computer-implemented method of claim 12 further comprising:
determining whether to transmit the unprocessed data or the processed data on the basis of the cost of transmission.

17. The computer-implemented method of claim 16 further comprising:
determining the cost of transmission by the amount of resource usage.

18. The computer-implemented method of claim 12 further comprising:
processing the unprocessed data into the processed data with an applet.

19. The computer-implemented method of claim 12 further comprising:
processing the unprocessed data into the processed data with a web browser.

20. The computer-implemented method of claim 12 further comprising:
loading into the memory web browser program for processing the unprocessed data into processed data.

21. The computer-implemented method of claim 12 further comprising:
receiving transmitted data in one of the unprocessed data and the processed data;
processing the transmitted unprocessed data into the processed data; and
transferring the processed data to a user interface.

22. The system of claim 1, wherein the transmitter for sending the selected one of the unprocessed data and the processed data comprises a transmitter for wirelessly sending the selected one of the unprocessed data and the processed data to a wireless handheld device.

23. The system of claim 22, wherein the wireless handheld device comprises a personal digital assistant (PDA).

24. The system of claim 22, wherein the wireless handheld device comprises a cellular telephone.

25. The system of claim 1, wherein the processed data comprises a subset of less than all of the unprocessed data.

26. The system of claim 25, wherein the processed data comprises data configured to be displayed on a user interface.

27. The system of claim 1, wherein the unprocessed data comprises data requiring processing by the web browser program prior to display on the user interface and the processed data comprises data configured to be displayed on a user interface.

28. The system of claim 1, wherein said processor executes the series of instructions to select the processed data and the unprocessed data by evaluating the time to transmit the processed data and the time it will take to transmit the unprocessed data, and selecting the option which will take a shorter total time.

* * * * *